Patented Aug. 29, 1967

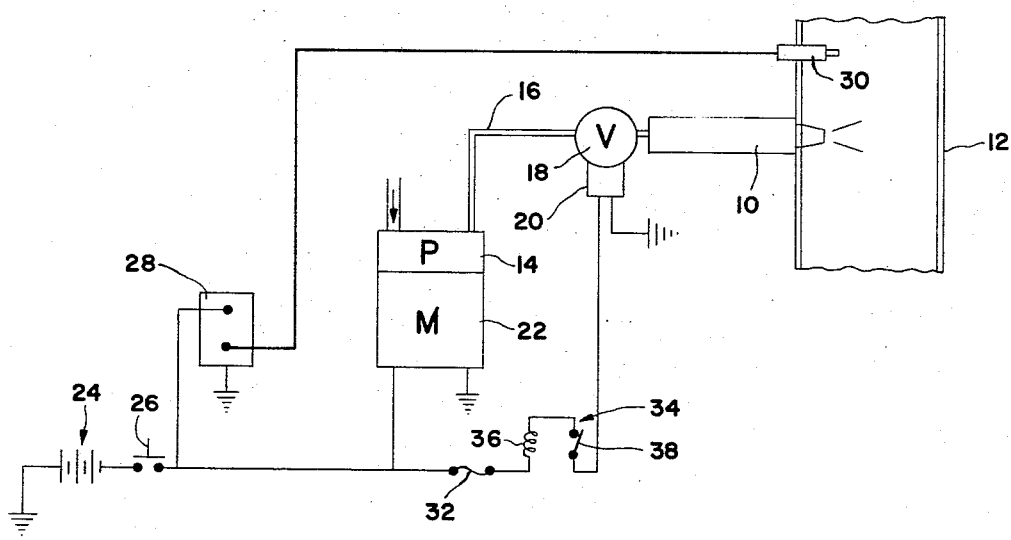

3,338,227
ENGINE STARTING SYSTEM
William A. Engstrom, Muskegon, Mich., assignor to Continental Motors Corporation, Muskegon, Mich., a corporation of Virginia
Filed Jan. 15, 1965, Ser. No. 425,732
4 Claims. (Cl. 123—180)

The present invention relates to compression-ignition internal combustion engines and the like and more particularly to an improved means to aid in the starting of such engines.

Because compression-ignition engines depend upon the heat generated by compressing the inducted air for producing combustion, the starting of such engines involves greater difficulty that starting other types of engines. If the atmospheric temperature is very low, it is hard to generate enough heat by compression to ignite the fuel being injected into the cold engine. The maximum temperature which can be produced in the cylinder when the engine is being cranked or motored over depends upon the temperature of air as it enters the engine as well as the temperature of the cylinder wall so that at extremely low ambient temperatures, it is virtually impossible to generate sufficient heat by merely cranking the engine to produce combustion. Because of this, numerous starting aids for such engines have been developed. Among these, the most commonly used is probably an electric heater plug disposed adjacent each combination chamber of the engine. These are rather expensive to produce and they constitute a substantial additional load on the starter battery just at the time the battery is being subjected to a heavy drain by the starter motor.

Another starting aid which is commonly used with compression-ignition engines is to provide a means for igniting fuel in the intake manifold of the engine to raise the temperature of the inducted air until the engine has picked up its cycle and has heated up. In such systems it has been found necessary to provide for pulsating or intermittent combustion ignition in the intake manifold to insure that sufficient air will enter the combustion chamber to initiate normal engine combustion. Heretofore, the means for providing such a pulsating flame in the intake manifold have been rather complex and expensive to produce. The present invention provides a simply constructed, economically manufactured system for preheating the intake manifold of a compression-ignition engine.

It is an object of the present invention to improve compression-ignition engines and the like by providing a reliable starting aid for such engines.

It is another object of the present invention to reduce the manufacturing costs of compression-ignition engines by providing a simply constructed and economically manufactured system for aiding in the starting of such engines.

It is still another object of the present invention to improve starting aids for compression-ignition engines and the like by providing means operable to produce a pulsating or intermittent flame in the intake manifold of such an engine.

It is yet another object of the present invention to increase the reliability of starting systems for compression-ignition engines and the like by providing such a system comprising a fuel injection means disposed within the intake manifold of such as engine, a solenoid actuated valve for regulating fuel flow to the injection means, means for igniting the injected fuel, and a coil heated thermostatic switch for intermittently energizing the solenoid valve.

Further objects and advantages of the present invention will readily appear to one skilled in the art to which the invention pertains upon reference to the following drawing illustrating diagrammatically the preferred starting system of the present invention.

*Description*

Now referring to the drawing for a more detailed description of the present invention, a preferred starting system for compression-ignition engines is therein illustrated as comprising a fuel injection nozzle 10 disposed to inject fuel into an intake manifold 12 of the engine. Fuel is delivered to the fuel injection nozzle 10 from a fuel source (not shown) by a pump 14 through a conduit 16. A valve 18 is disposed within the conduit 16 to regulate fuel flow to the injection nozzle 10 and is actuated by a solenoid 20. Pump 14 is actuated by an electric motor 22.

A preferred electrical system of the present invention comprises a source of electrical power as indicated at 24 which is connected through an on-off switch 26 and a conventional ignition coil 28 to a spark plug 30. The spark plug 30 is disposed within the intake manifold 12 closely adjacent the injection nozzle 10 to ignite the fuel injected into the intake manifold 12 by the injection nozzle 10. The motor 22 is also electrically connected to the source of power 24 through the switch 26. The solenoid 20 is connected through the switch 26, a fuse 32 and a relay indicated generally at 34, and is operable to open the valve 18 upon being energized and to close the valve 18 upon being deenergized. The relay 34 as illustrated diagrammatically preferably comprises a series connected coil 36 and a normally closed heat responsive switch 38. The switch 38 is of a conventional bimetallic construction such that upon being heated by the coil 36, the leaf member of the switch 38 will be warped to an open position. Upon the switch 38 being warped to an open position, the coil 36 is deenergized to permit the leaf member of the switch 38 to cool and to return to a closed position to again energize the coil 36 to repeat the cycle. With the switch 38 closed, the solenoid 20 is energized and with the switch 38 open, the solenoid 20 is deenergized. Thus whenever the switch 26 is moved from the normally opened position to a closed position, the relay 34 is operable through the solenoid 20 to produce intermittent opening and closing of valve 18.

When it is desired to aid in starting the compression-ignition engine, the switch 26 is moved from a normally open position to a closed position to energize the spark plug 30, the motor 22, and to initiate action of the relay 34. The relay 34 opens and closes the circuit to the solenoid 20 intermittently as described above to alternately energize and deenergize the solenoid 20. The solenoid 20 in turn produces an alternating opening and closing of the valve 18. The motor 22 drives the pump 14 to deliver fuel through the valve 18 to the injection nozzle 10 whenever the valve 18 is open. This produces a sequence of pulsating or intermittent jets of fuel being injected into the intake manifold 12, each jet of fuel being ignited by the spark plug 30. In this way, the heat generated in the intake manifold 12 raises the temperature of the inducted air sufficiently so that compression-ignition can be produced in the combustion chamber of the engine as the engine is being turned over.

Because the flame produced in the intake manifold 12 is not a constant flame but rather combustion is produced at spaced intervals in the inducted air, sufficient unconsumed air is inducted into the combustion chamber of the engine to produce normal operation thereof. Once the compression ignition engine has begun its normal cycle of operation, the switch 26 is moved to an open position to deenergize the spark plug 30, the motor 22 and the solenoid 20.

It is apparent that a system has been described which will produce sufficient heat without sacrificing inducted air to insure ready starting of a compression-ignition engine even in severely cold weather. The system of the present invention adds little cost to the engine since the number and complexity of the required parts is kept to a minimum. Reliability is achieved by the use of elements which have long been used for other purposes.

It is also apparent that although it has been preferred to describe the system of the present invention as including a thermostatic type on and off switch to produce the intermittent fuel flow, other types of switching means could be used for this purpose as well.

It is further apparent that although I have described but a single embodiment of the present invention, many changes and modifications can be made thereto without departing from the spirit of the invention as expressed by the scope of the appended claims.

I claim:
1. A system to aid in starting a compression ignition engine having an intake manifold, said system comprising:
  (a) injection means for discharging fuel into said intake manifold;
  (b) pumping means for delivering fuel to said injection means;
  (c) means selectively operable to produce an intermittent discharge of fuel into said intake manifold comprising:
    (1) a solenoid-valve disposed intermediate said pumping means and said injection means and operable to open and close fuel flow to said injection means;
    (2) electrical means for actuating said solenoid valve including a normally closed heat responsive switch and means operable upon being energized to heat said switch to produce opening thereof, said switch and said heat producing means being series connected with said solenoid valve; and
  (d) means for igniting the fuel discharged into said intake manifold.

2. A system for use with a compression ignition engine having an intake manifold, comprising:
  (a) source of electrical power;
  (b) an electrically actuated fuel igniting means disposed within said intake manifold and electrically connected with said source of electrical power;
  (c) a fuel injection nozzle disposed in said intake manifold adjacent said fuel igniting means;
  (d) an electrically actuated pumping means connected to said fuel injection nozzle, said pumping means being electrically connected with said source of electrical power;
  (e) valve means disposed intermediate said pumping means and said fuel injection nozzle; and
  (f) means selectively operable to intermittently actuate said valve means to open and close whereby pulses of fuel are discharged into said intake manifold, comprising:
    (1) a solenoid operably connected with said valve means to actuate same upon being energized; and
    (2) means electrically connecting said source of electrical power to said solenoid and including automatically operable switching means electrically disposed intermediate said source of power and said solenoid.

3. The system as defined in claim 2, wherein said switching means comprises:
  (a) a heat responsive switch;
  (b) means operable upon being energized to produce heat,
  (c) said switch and said heat producing means being disposed closely adjacent to one another and being electrically series connected.

4. The system as defined in claim 3, wherein said fuel igniting means, said pumping means and said solenoid are all electrically connected to said source of electrical power through a normally open switch.

References Cited
UNITED STATES PATENTS

| | | | |
|---|---|---|---|
| 1,451,434 | 4/1923 | Roesch | 123—179 X |
| 1,624,139 | 4/1927 | Kettering | 123—180 X |
| 2,229,714 | 1/1941 | Wirrer | 123—179 |
| 2,993,487 | 7/1961 | Konra et al. | 123—179 X |
| 3,024,777 | 3/1962 | Baker | 123—122 |

OTHER REFERENCES

The S.A.E. Journal, published by the Society of Automotive Engineers, July 1964, 485 Lexington Ave., N.Y. 10017, pages 48 and 49 of chapter entitled: Lycoming S & H Multifuel Engine etc.

LAURENCE M. GOODRIDGE, *Primary Examiner.*

MARK M. NEWMAN, *Examiner.*